(12) United States Patent
Harris

(10) Patent No.: US 9,753,295 B2
(45) Date of Patent: Sep. 5, 2017

(54) APPARATUS AND METHOD OF MANUFACTURE FOR A LAYERED ARTWORK

(71) Applicant: Howard Harris, Denver, CO (US)

(72) Inventor: Howard Harris, Denver, CO (US)

(*) Notice: Subject to any disclaimer, the term of this patent is extended or adjusted under 35 U.S.C. 154(b) by 0 days.

(21) Appl. No.: 15/276,186

(22) Filed: Sep. 26, 2016

(65) Prior Publication Data

US 2017/0038599 A1 Feb. 9, 2017

Related U.S. Application Data

(63) Continuation-in-part of application No. 14/870,284, filed on Sep. 30, 2015, now abandoned.

(60) Provisional application No. 62/058,754, filed on Oct. 2, 2014.

(51) Int. Cl.
*B44F 7/00* (2006.01)
*G02B 27/22* (2006.01)
*B44F 1/10* (2006.01)

(52) U.S. Cl.
CPC .......... *G02B 27/2278* (2013.01); *B44F 1/10* (2013.01); *B44F 7/00* (2013.01); *G02B 27/2271* (2013.01)

(58) Field of Classification Search
CPC . G09F 1/00; G09F 11/23; B42D 15/02; B44F 7/00
See application file for complete search history.

(56) References Cited

U.S. PATENT DOCUMENTS

| | | | |
|---|---|---|---|
| 2,151,055 A * | 3/1939 | Stark | B44F 7/00 273/157 A |
| 2,880,541 A | 4/1959 | Kahn | |
| 3,046,686 A | 7/1962 | Fogle | |
| 3,314,180 A * | 4/1967 | Wyndham | B44F 7/00 40/436 |
| 3,997,991 A | 12/1976 | Hayman-Chaffey et al. | |
| 4,757,626 A | 7/1988 | Weinreich | |
| 5,003,715 A | 4/1991 | Steiner | |
| 5,110,295 A | 5/1992 | Concra | |
| 5,295,221 A | 3/1994 | Roslan | |
| 5,415,902 A | 5/1995 | Stryker, Jr. | |
| 5,426,879 A | 6/1995 | Hecker | |
| 5,741,578 A | 4/1998 | Sax | |
| D415,218 S | 10/1999 | Corliss | |
| 6,096,409 A | 8/2000 | McLaughlin | |
| 6,125,564 A | 10/2000 | Young | |

(Continued)

FOREIGN PATENT DOCUMENTS

JP 2007102147 A 4/2007

*Primary Examiner* — Cassandra Davis
(74) *Attorney, Agent, or Firm* — James A. Sheridan; Sheridan Law, LLC

(57) ABSTRACT

The disclosure provides apparatus and methods of manufacture pertaining to a layered artwork that provides the illusion of depth, or three-dimensional volume, and that shifts in color and spatial relationships as a viewer moves in relation to the artwork or as the light cast upon the artwork changes in intensity, angle, and/or color. The layered artwork may include a base image reproduced on a rigid substrate and at least one top image reproduced on one or more translucent substrates. The translucent substrates may be suspended above the rigid substrate such that a viewer sees both the base and top images when viewing the artwork. Other embodiments are also disclosed.

20 Claims, 6 Drawing Sheets

(56) References Cited

U.S. PATENT DOCUMENTS

| | | |
|---|---|---|
| 6,205,692 B1 | 3/2001 | Kite |
| 6,898,883 B2 | 5/2005 | Bramer |
| 6,918,199 B1 | 7/2005 | Preta |
| 6,989,931 B2 | 1/2006 | Rosenthal |
| 7,294,221 B2 | 11/2007 | Bramer |
| 7,403,309 B2 | 7/2008 | Moncrieff |
| 7,607,854 B1 | 10/2009 | Goodson et al. |
| 7,619,585 B2 | 11/2009 | Bell et al. |
| 7,629,400 B2 | 12/2009 | Hyman |
| 7,682,476 B2 | 3/2010 | Sutton |
| 7,691,470 B2 | 4/2010 | Goodson et al. |
| 7,691,486 B1 | 4/2010 | Suare et al. |
| 7,748,152 B2 | 7/2010 | Reinold et al. |
| 7,824,759 B1 | 11/2010 | Goodson |
| 7,989,040 B2 | 8/2011 | Stark |
| 8,046,967 B2 | 11/2011 | Suare et al. |
| 8,057,980 B2 | 11/2011 | Dunn et al. |
| 8,327,589 B2 | 12/2012 | Sutton et al. |
| 8,512,505 B2 | 8/2013 | Suare et al. |
| 8,584,421 B2 | 11/2013 | Norton et al. |
| 8,637,727 B2 | 1/2014 | Maldonado et al. |
| 2005/0022436 A1 | 2/2005 | Lehmkuhl et al. |
| 2005/0219626 A1 | 10/2005 | Moncrieff |
| 2006/0080878 A1 | 4/2006 | Kittrell, III |
| 2009/0211138 A1 | 8/2009 | Burman et al. |
| 2011/0078932 A1* | 4/2011 | Wilcoxen ............ A63F 1/02 40/124.191 |
| 2011/0147555 A1 | 6/2011 | Harris et al. |
| 2011/0214379 A1 | 9/2011 | Norton et al. |
| 2012/0088042 A1 | 4/2012 | Adickes |

* cited by examiner

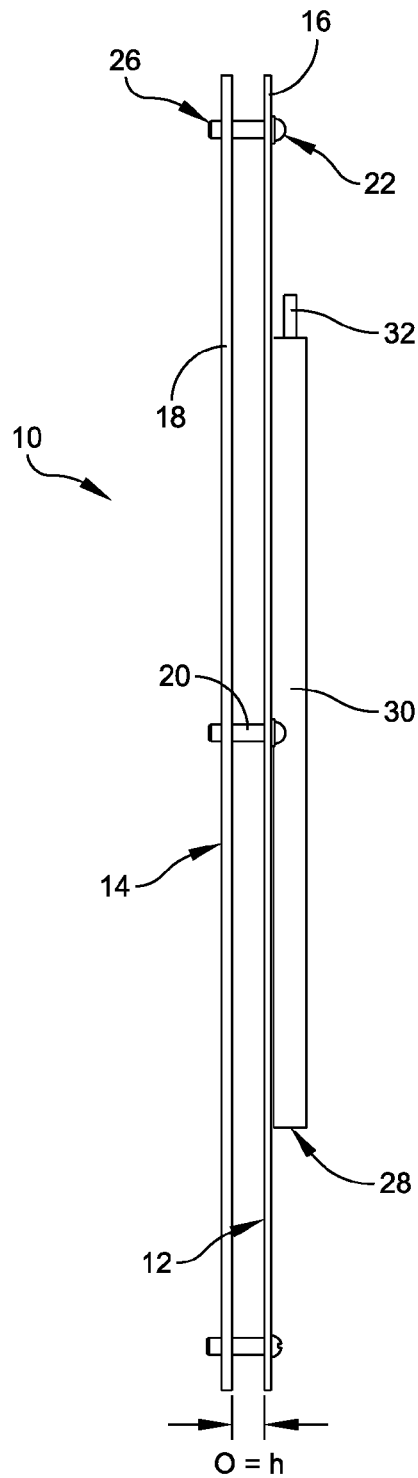
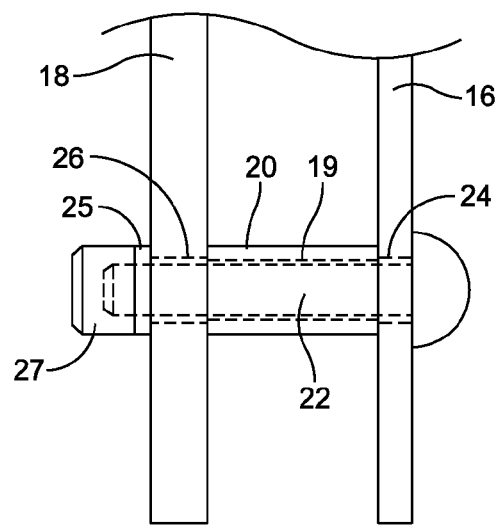
FIG. 1
FIG. 1A

APPARATUS AND METHOD OF MANUFACTURE FOR A LAYERED ARTWORK

REFERENCE TO PENDING PRIOR PATENT APPLICATION

This application is a continuation-in-part of pending prior U.S. patent application Ser. No. 14/870,284, filed Sep. 30, 2015 by Howard Harris for "APPARATUS AND METHOD OF MANUFACTURE FOR A LAYERED ARTWORK," which claims the benefit under 35 U.S.C. 119(e) of U.S. Provisional Patent Application No. 62/058,754, filed Oct. 2, 2014 by Howard Harris for "APPARATUS AND METHOD OF MANUFACTURE FOR A LAYERED VISUAL DISPLAY," both of which patent applications are hereby incorporated herein by reference.

BACKGROUND

Hanging (or otherwise displayed) artworks generally feature a two-dimensional quality that offers a consistent and cohesive viewing experience. Such images may be formed through any traditional means. For instance, two-dimensional images may be photographs, pencil or ink illustrations, paintings, and/or electronically generated images. With two-dimensional images, a viewer sees the same image when viewing the work from any vantage point relative to the displayed artwork, regardless of the intensity, color, and/or angle of light cast upon the displayed artwork.

Some artwork producers have experimented with layered works, or artworks that involve the layering of two-dimensional images. These works generally involve a base image layered beneath one or more completely "clear" overlays (i.e., both transparent and imageless overlays). Alternatively, existing works may feature a closely spaced layering of one or more two-dimensional images stacked above a transparent and backlit base image.

While these existing layering techniques may achieve an interesting aesthetic effect (highlighting, distortion of certain aspects of an image, melding aspects of two or more images such that they appear as one, etc.), current techniques do not result in adaptive artworks that may be specifically configured to provide a desired illusion of a three-dimensional volume with shifting color and/or spatial relationships as the viewer moves past the work and/or as the light cast upon the artwork changes in color, intensity, and/or angle.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

One embodiment provides a method of generating a layered artwork for display. The method includes the steps of (1) providing a rigid substrate having front and rear surfaces; (2) reproducing a base image on the front surface of the rigid substrate; (3) providing a translucent substrate having front and rear surfaces; (4) reproducing a top image on the front surface of the translucent substrate; and (5) mounting the translucent substrate to the rigid substrate such that there is a defined offset between the front surface of the rigid substrate and the rear surface of the translucent substrate.

Another embodiment provides a layered artwork that projects an illusion of three-dimensional volume that shifts in color and spatial relationships as a viewer moves in relation to the artwork. The layered artwork includes a rigid substrate having front and rear surfaces, with a base image reproduced on the front surface of the rigid substrate. The artwork also includes a translucent substrate having front and rear surfaces, with a top image reproduced on the front surface of the translucent substrate. The translucent substrate is mounted to the rigid substrate such that the top image overlays the base image at a defined offset.

Yet another embodiment provides another layered artwork. The layered artwork includes a top image suspended at a defined offset above a base image, where the base image is visible through the top image such that the top image and the base image combine to project an illusion of a three-dimensional volume.

Other embodiments are also disclosed, and additional objects, advantages and novel features of the technology will be set forth in part in the following description, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which:

FIG. 1 provides a side plan view of one embodiment of a layered artwork;

FIG. 1A provides an enlarged partial side view of a portion of the layered artwork of FIG. 1;

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Various embodiments of the systems and methods described herein relate to a layered artwork that provides the impression of a three-dimensional volume that shifts in color and spatial relationships based on a viewer's vantage point in relation to the artwork and/or on the intensity, color, and/or angle of the light cast upon the artwork.

Figure 2:
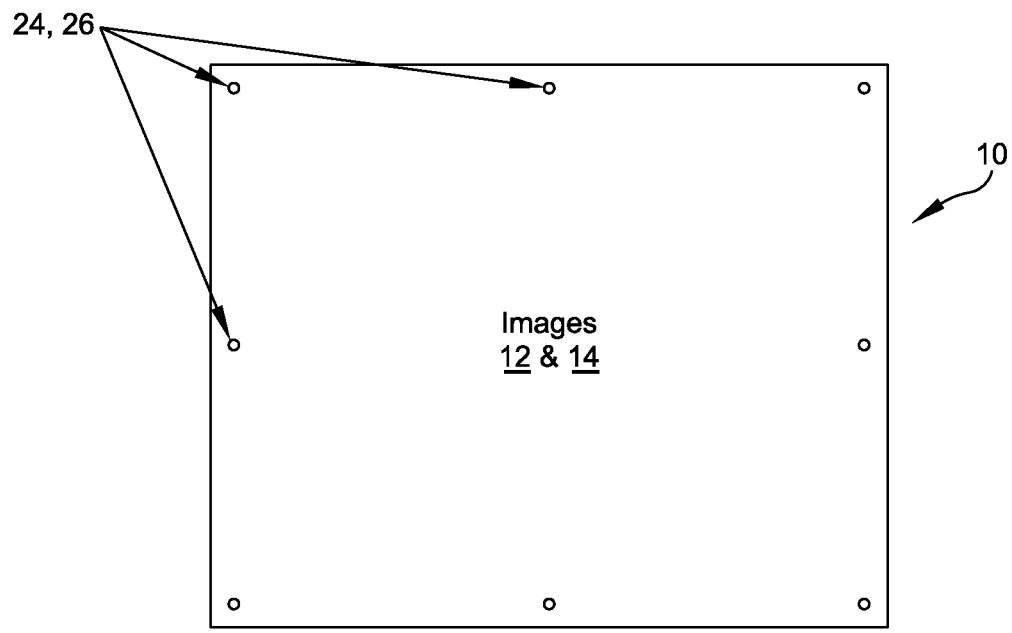
FIG. 2 provides a front plan view of the layered artwork of FIG. 1.

FIGS. 1 and 2 show side and front plan views of one embodiment of a layered artwork 10, respectively. In this embodiment, layered artwork 10 includes both a base image 12 and a top image 14. In greater detail, base image 12 may be a color or black-and-white image generated using any appropriate artistic technique or combination of techniques, including, for example, photography, electronic image generation (e.g., Adobe Photoshop, Adobe Illustrator, etc.), and/or manual illustration and/or painting.

Figure 3:
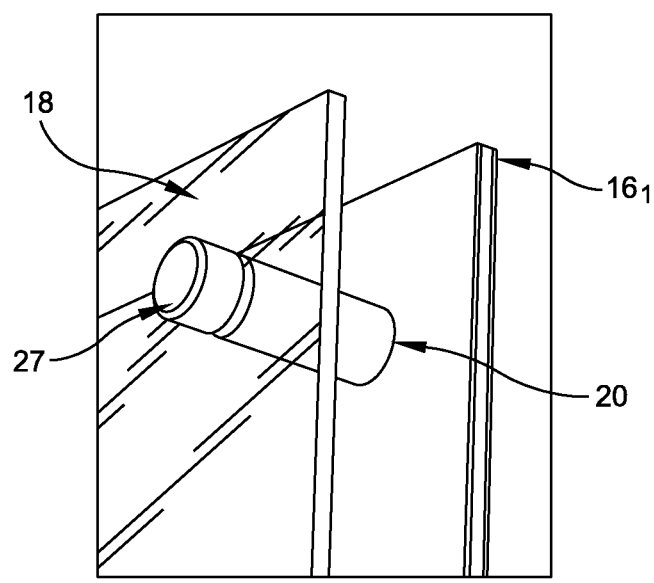
FIG. 3 provides a perspective corner view of the layered artwork of FIG. 1.

Base image 12 may be printed or otherwise reproduced on a rigid substrate 16. Rigid substrate 16 may be formed, in all or in part, of any appropriate material or combination of materials. Discussed in further detail below in relation to FIGS. 3-5, these materials may include, for example, photo paper (e.g., Fuji Crystal archive paper, Moab Slickrock Metallic Silver 300), aluminum or an aluminum composite (e.g., e-panel 3 mm brushed silver/mill finish, Dibond 0.3 mm brushed aluminum-polyethylene core composite panel, United Industries Ultra Board aluminum-brushed chrome-polystyrene high density foam core composite panel), stainless steel (e.g., Dibond 0.3 mm stainless steel-polyethylene core composite panel), or acrylic (e.g., ¼" clear Plexiglas).

In embodiments in which base image 12 is reproduced onto photo paper, the photo paper may then be mounted upon a rigid substrate. For example, in one embodiment, an aluminum composite panel may form a rigid substrate $16_1$, shown in FIG. 3.

Figure 4:
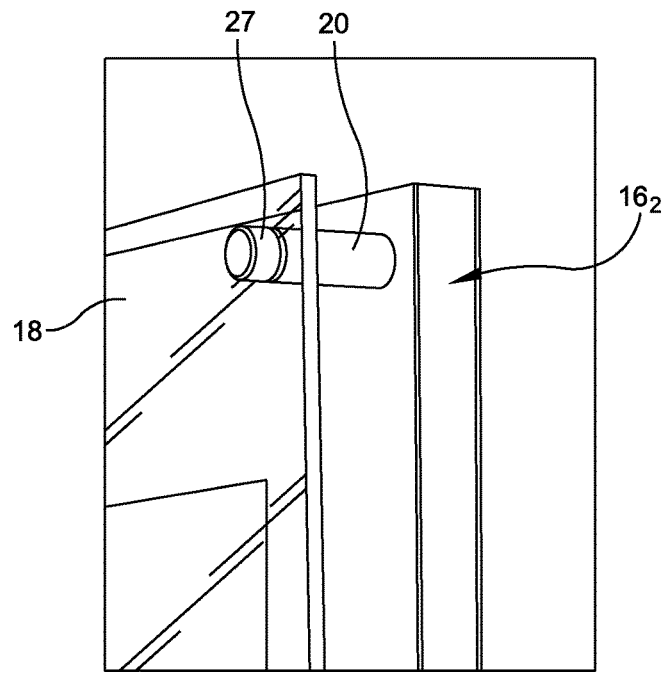
FIG. 4 provides a perspective corner view of another embodiment of a layered artwork.

In embodiments in which base image 12 is printed directly onto an aluminum or stainless steel surface, the metal may be laminated to a foam board to form a rigid substrate $16_2$, as shown in FIG. 4. In one embodiment, the foam board may have a thickness of approximately ⅝". However, the foam board is meant to add rigidity and may have any appropriate thickness. Alternatively, the aluminum or stainless steel upon which base image 12 is printed may be laminated to a PVC board of equivalent rigidity.

Figure 5:
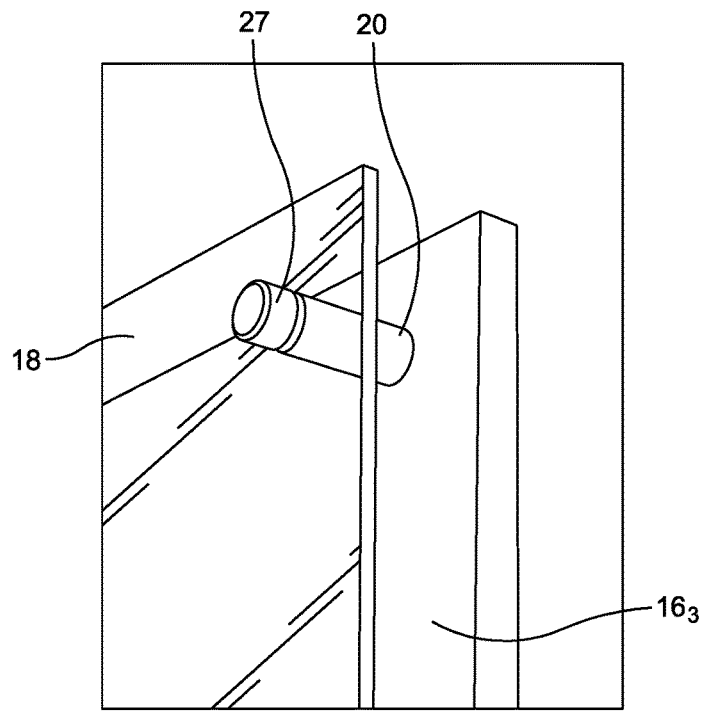
FIG. 5 provides a perspective corner view of yet another embodiment of a layered artwork.

In embodiments in which base image 12 is reproduced directly onto an acrylic substrate, the image may be face mounted onto a board of optically clear acrylic having a thickness of approximately ¼" to form a rigid substrate $16_3$, shown in FIG. 5. The edges of base image 12 may be flame-polished or sanded for a consistent, clear look across the span of rigid substrate $16_3$.

The process of printing base image 12, regardless of the material of substrate 16, may involve a traditional inkjet process adapted for a paper, metal, or plastic substrate. Other printing techniques may apply as appropriate and/or necessary.

Returning to FIGS. 1-2, top image 14 may be printed onto a translucent substrate 18 having any appropriate thickness. In one embodiment, translucent substrate 18 may have a thickness of approximately ¼" and may be formed of any appropriate material, such as clear acrylic, glass, polyester or another clear or transparent material, so long as the material is at least minimally translucent to allow a viewer to view base image 12 through translucent substrate 18 when rigid substrate 16 and translucent substrate 18 are stacked, as shown in FIG. 1.

Embodiments of top image 14 may vary in any appropriate and/or aesthetically pleasing manner, dependent upon personal preferences regarding the desired overall artistic impression of layered artwork 10. For instance, top image 14 may be identical to base image 12. In other embodiments, top image 14 may be a modified version of base image 12 or a completely different image. Top image 14 may be printed as a geometrical pattern, such as a series of grid patterns and/or line sequences, and may feature color or be entirely black and white. Top image 14 may also feature a number of cutout patterns placed directly onto translucent substrate 18. Creatively varying the presentation of top image 14 will have a corresponding effect on the three-dimensional optical illusions ultimately created by the combination of top image 14 and base image 12.

A number of standoffs 20 may be used to attach translucent substrate 18 to rigid substrate 16, such that top image 14 is suspended above base image 12 at a precisely defined offset, o, as shown in FIG. 1. Offset, o, is equal to a height, h, of each standoff 20. In this configuration, a viewer viewing layered artwork 10 perceives top image 14, which is reproduced on translucent substrate 18, as well as base image 12 situated behind it. The height, h, of standoffs 20 may be set to any appropriate or desired length to create a preferred illusion of depth, dimensionality, and movement in the overall layered artwork 10.

Standoffs 20 may have any appropriate size, shape, and/or configuration and may be formed of any appropriate material. In one embodiment, standoffs 20 may be formed of anodized aluminum (e.g., S038-075B ⅜" diameter black anodized aluminum, S058-075B ⅝" diameter black anodized aluminum, S050-075B ½" diameter black anodized aluminum) or stainless steel. In addition, standoffs 20 may be attached between rigid substrate 16 and translucent substrate 18 in any appropriate manner using either off-the-shelf or custom fasteners. In one embodiment, each standoff 20 may feature a hollow inner diameter 19 sized to accommodate a machine screw 22 of appropriate length and diameter (e.g., varying lengths and diameters of SC114-6842 slotted round head machine screws, SC140-6102 Phillips pan head machine screws, SC166-8402 Phillips pan head machine screws, or SC166-9402 Phillips pan head machine screws).

FIG. 1A provides an enlarged partial side view detailing the placement of standoffs 20 between rigid substrate 16 and transparent substrate 18. That is, to suspend translucent substrate 18 (featuring top image 14) above rigid substrate 16 (featuring base image 12), each of screws 22 may be installed from a rear face of rigid substrate 16. Each screw 22 may traverse one of a number of clearance holes 24 drilled through rigid substrate 16, the hollow inner diameter 19 of one of standoffs 20, and a corresponding clearance hole 26 drilled through translucent substrate 18. Screw 22 may be tightened against the front face of translucent substrate 18 with a washer 25 and a threaded cap 27 designed to match standoff 20 for aesthetic purposes (e.g., varying diameters of black anodized CAP038B, CAP058B, or CAP050B). Notably, the diameter and number of clearance holes 24, 26, the size of screws 22, and the corresponding inner diameter 19 of standoffs 20 may vary depending on the properties of layered artwork 10, such as, for example, the chosen materials and thicknesses of rigid substrate 16 and translucent substrate 18 and the desired offset between base image 12 and top image 14.

Figure 6:
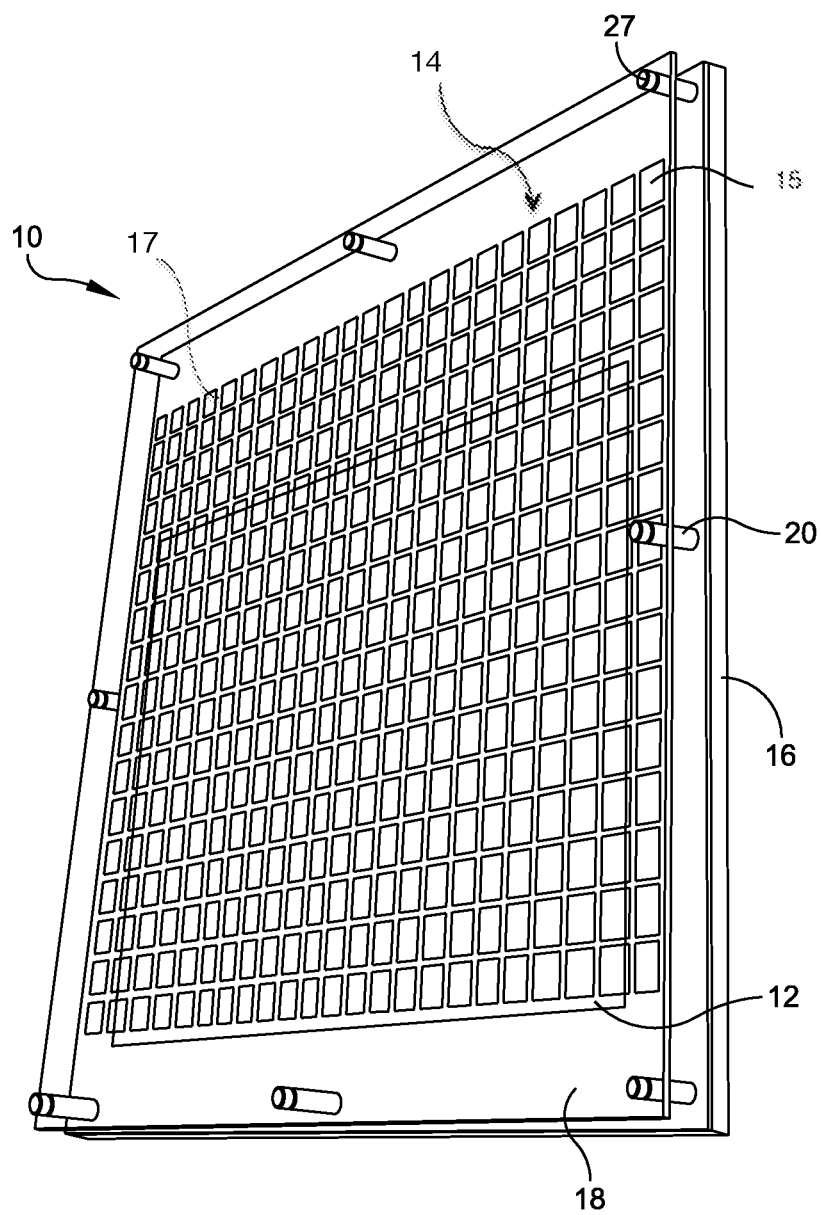
FIG. 6 provides a front perspective view of the layered artwork of FIG. 1.

FIG. 6 shows a front perspective view of one embodiment of a complete layered artwork 10. The layering technique discussed above, in which base image 12 is layered beneath at least one minimally translucent top image 14 suspended above base image 12 at a specifically defined offset, results in an illusion of depth, dimensionality, and movement. This illusion changes or alters as a viewer moves through different vantage points relative to the artwork and/or depending on the intensity, angle, and/or color of light highlighting the artwork. To achieve different illusions, embodiments of layered artwork 10 may vary according to a number of factors. For example, an artist may vary the nature of base image 12 and/or top image 14, the materials used for rigid substrate 16 and/or translucent substrate 18, the height of offset, o, between substrates 16 and 18, and/or the number of layered images. In this regard, an artist may create a virtually unlimited number of unique layered works.

Figure 7:
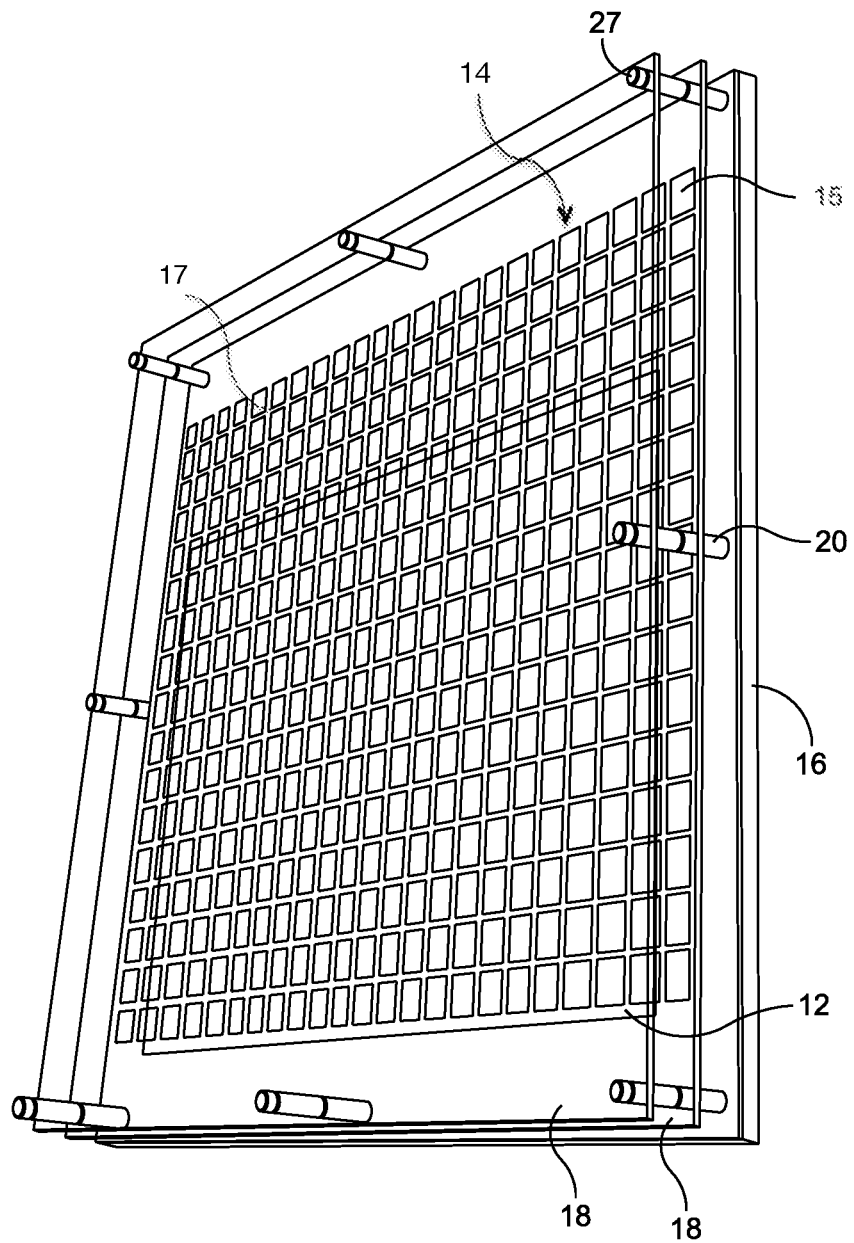
FIG. 7 provides a front perspective view of another embodiment of a layered artwork.

In one embodiment, top image 14 may be identical to or a copy of base image 12, wherein top image 14 is segmented into a number of cutout patterns 15 that are offset or spaced apart from one another and placed upon translucent substrate 18, as shown in FIGS. 6-7. In this regard, each of cutout patterns 15 is offset a distance 17 from the surrounding cutout patterns 15. Employing a top image that begins with a copy or duplicate of the base image, separates that top image into smaller cutout patterns, and then spaces those cutout patterns such that they are offset from one another when placed upon the translucent substrate results in "negative space" between each of the cutout patterns of the top image. This negative space within the top image allows the identical base image to be viewed therethrough and has a complex affect on the resulting layered artwork that causes a viewer to visually perceive the layered artwork in a manner that differs from objective reality. The defined offset, o, between base image 12 and top image 14, as well as the defined distance 17, or the negative space, between each of cutout patterns 15 of top image 14, cause the viewer to see a three-dimensional illusion of the actual two-dimensional images reproduced on the base and top substrates.

While layered artwork 10 is discussed above as a two-layered artwork having a base image 12 and a top image 14, embodiments of layered artwork 10 may include additional image layers to achieve a more complex and/or aesthetically interesting end result. In one embodiment shown in FIG. 7, additional image layers may be added by suspending one or more additional translucent substrates 18 (each carrying a top image 14) above the existing artwork 10 using the standoff technique described in relation to FIG. 1A or any other appropriate suspension mechanism. In various embodiments, additional layers may overlay all or merely a portion of rigid substrate 16 and base image 12 to achieve a desired aesthetic effect.

To hang or display the attached rigid and translucent substrates 16, 18 on a wall or other surface, a box-cleat and ring hanging system 28 may be affixed to the rear face of rigid substrate 16, as shown in FIG. 1. Hanging system 28 may be a commercially available system or one custom made for layered artwork 10. In one embodiment, hanging system 28 may include a frame 30 formed of medium density fiber board or e-PVC high density board. Frame 30 may be attached to the surface of rigid substrate 16 using any appropriate adhesive (e.g., Loctite Clear Power Grab heavy duty construction adhesive, 3MT VHBT Tape RP16), and, in turn, a hanging element 32 may attach to frame 30 in any appropriate manner. In one embodiment, hanging element 32 may include a wire hanger (e.g., No. 2 Anchor Superior 5 pound twisted wire) threaded through a pair of eye screws (e.g., LR206 Zinc LRG Steel Eye Screw #10) attached to frame 32. Notably, embodiments of layered artwork 10 may incorporate any appropriate hanging or display system depending upon the size of the artwork, the configuration of the artwork, and/or the space chosen to display the artwork.

Figure 8:
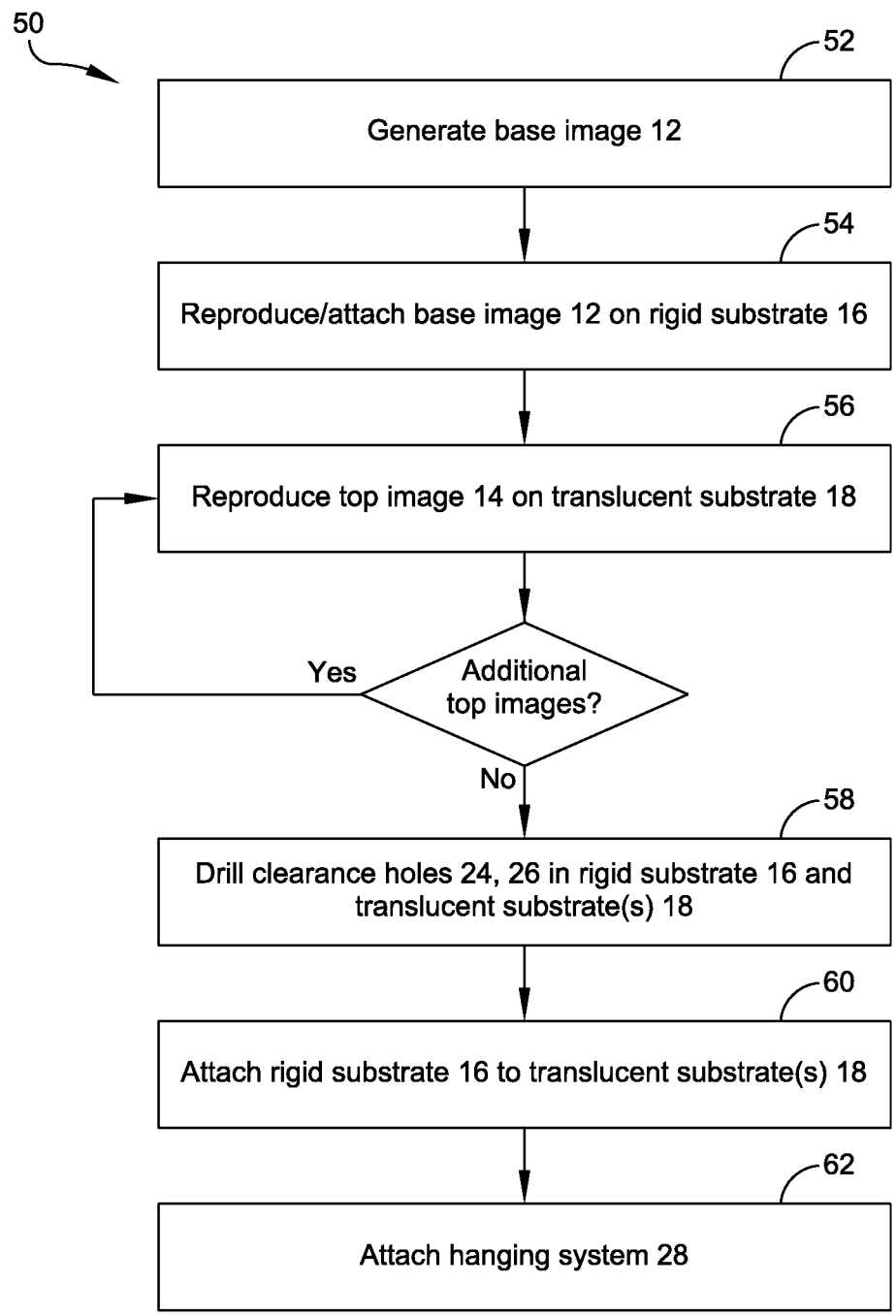
FIG. 8 provides a flow diagram depicting an exemplary method for manufacturing embodiments of a layered artwork.

FIG. 8 provides a flow chart depicting an exemplary method 50 for creating embodiments of layered artwork 10. Method 50 begins with the generation of base image 12 (52).

As discussed above, base image 12 may be generated electronically or by hand, using any appropriate artistic technique. Method 50 continues with the attachment or application of base image 12 on or to rigid substrate 16 (54). Next, top image 14 may be reproduced onto (e.g., printed directly onto or attached to) translucent substrate 18 (56). If more than one top image 14 will be suspended above base image 12, then this step (56) may be repeated, and additional images 14 may be applied to additional translucent substrates 18.

Once base image 12 and top image 14 have been reproduced onto substrates 16 and 18, respectively, method 50 continues with the drilling of an appropriate number of clearance holes 24 and 26 through rigid substrate 16 and translucent substrate 18 (58), respectively. Then translucent substrate 18 may be attached at an offset, o, from rigid substrate 16 using a standoff 20 for each set of aligned clearance holes 24, 26 (60). If numerous top images 14 are to be added, then an additional layer of standoffs 20 (of the same or differing height as the original set) may be used to offset the additional translucent substrates 18 from the first translucent substrate 18. Once substrates 16, 18 have been securely attached, method 50 may conclude with the attachment of hanging system 28 (62).

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A method of generating a layered artwork for display, comprising:
   providing a rigid substrate having front and rear surfaces;
   reproducing a base image on said front surface of said rigid substrate;
   providing a translucent substrate having front and rear surfaces;
   reproducing a top image on said front surface of said translucent substrate, said reproducing said top image comprising:
      modifying a copy of said base image to form a number of cutout patterns from said copy of said base image; and
      reproducing said cutout patterns directly onto said front surface of said translucent substrate such that each of said cutout patterns is offset from one another; and
   mounting said translucent substrate to said rigid substrate such that there is a defined offset between said front surface of said rigid substrate and said rear surface of said translucent substrate.

2. The method of claim 1, wherein said base image is generated photographically, through illustration, through painting, or electronically.

3. The method of claim 1, wherein said rigid substrate is formed of acrylic, aluminum, stainless steel, or photo paper.

4. The method of claim 1, wherein said cutout patterns of said top image form a larger geometric pattern.

5. The method of claim 4, wherein said geometric pattern comprises a grid pattern.

6. The method of claim 4, wherein said geometric pattern is black-and-white.

7. The method of claim 1, wherein said translucent substrate comprises clear acrylic, glass, or polyester.

8. The method of claim 1, wherein said mounting said translucent substrate comprises setting said defined offset to achieve a three-dimensional optical illusion in said layered artwork.

9. The method of claim 1, further comprising:
providing a second translucent substrate having front and rear surfaces;
reproducing a second top image on said front surface of said second translucent substrate; and
mounting said second translucent substrate to said translucent substrate such that there is a second defined offset between said front surface of said translucent substrate and said rear surface of said second translucent substrate.

10. A layered artwork that projects an illusion of three-dimensional volume that shifts in color and spatial relationships as a viewer moves in relation to said artwork, comprising:
a rigid substrate having front and rear surfaces;
a base image reproduced on said front surface of said rigid substrate;
a translucent substrate having front and rear surfaces; and
a top image reproduced on said front surface of said translucent substrate, said top image comprising a copy of said base image, wherein said copy of said base image is segmented into a number of cutout patterns, each of said cutout patterns offset a defined distance from one another, and wherein said translucent substrate is mounted to said rigid substrate such that said top image overlays said base image at a defined offset.

11. The layered artwork of claim 10, further comprising a plurality of standoffs having first and second ends, said first ends affixed to said front surface of said rigid substrate and said second ends affixed to said rear surface of said translucent substrate such that said translucent substrate is suspended above said rigid substrate by said defined offset.

12. The layered artwork of claim 11, wherein said defined distance and said defined offset are configured to achieve a desired three-dimensional optical illusion in said layered artwork.

13. The layered artwork of claim 10, wherein said base image is generated photographically, through illustration, through painting, or electronically.

14. The layered artwork of claim 10, wherein said top image comprises a geometric pattern.

15. The layered artwork of claim 10, wherein said translucent substrate is formed of clear acrylic.

16. The layered artwork of claim 10, further comprising:
a second translucent substrate having front and rear surfaces;
a second top image reproduced on said front surface of said second translucent substrate; and
a plurality of second standoffs having first and second ends, said first ends affixed to said front surface of said translucent substrate and said second ends affixed to said rear surface of said second translucent substrate such that said second translucent substrate is suspended above said translucent substrate at a second defined offset.

17. A layered artwork, comprising a top image suspended at a defined offset above a base image, wherein:
said top image comprises a copy of said base image;
said copy of said base image is segmented into a number of cutout patterns, each of said cutout patterns offset a defined distance from one another; and
said base image is visible through said top image such that said top image and said base image combine to project an illusion of a three-dimensional volume.

18. The layered artwork of claim 17, wherein said base image is reproduced on a rigid substrate and said top image is reproduced on a transparent substrate, and wherein a plurality of standoffs separate said rigid substrate and said transparent substrate by said defined offset.

19. The layered artwork of claim 18, further comprising a second top image suspended at a second defined offset above said first top image.

20. The layered artwork of claim 19, wherein said second top image is reproduced on a second transparent substrate, and wherein a plurality of second standoffs separate said transparent substrate and said second transparent substrate by said second defined offset.

* * * * *